Dec. 9, 1952     W. L. LEWIS     2,620,755

FILLED COOKY CUTTER

Filed June 22, 1951

INVENTOR
WILMA L. LEWIS,

BY
McMorrow, Berman & Davidson
ATTORNEYS

Patented Dec. 9, 1952

2,620,755

UNITED STATES PATENT OFFICE 2,620,755

FILLED COOKY CUTTER

Wilma L. Lewis, Douglas, Wyo.

Application June 22, 1951, Serial No. 232,945

1 Claim. (Cl. 107—47)

This invention relates to kitchen implements, and more particularly, has reference to a dough cutter specifically adapted for crimping and cutting filled cookies or the like.

It is one important object of the present invention to provide a cutter of the character described so formed that when pressed downwardly upon superposed layers of dough between which is provided a quantity of filling, it will sever both layers along registering lines, and will simultaneously crimp the layers together through the full circumference of the portions cut therefrom.

Another important object is to provide a cutter that will efficiently discharge the functions set forth above, and yet will be capable of manufacture at low cost, said cost being little more than that involved in the manufacture of a conventional cookie or dough cutter.

Still another object is to provide a dough cutter of the type stated that will have no relatively movable parts, and that will be capable of being easily cleaned.

Yet another object is to provide a cutter of the character described novelly designed as to permit the manufacture thereof in various forms, whereby the cookies can be cut to selected ornamental shapes.

Another important object is to provide a cookie cutter of the type stated wherein the crimped area is spaced inwardly from the line along which the dough is severed, so as to assure adherence of the layers to one another throughout said crimped area during the baking of the cookies.

Referring to the drawings.

Figure 1:
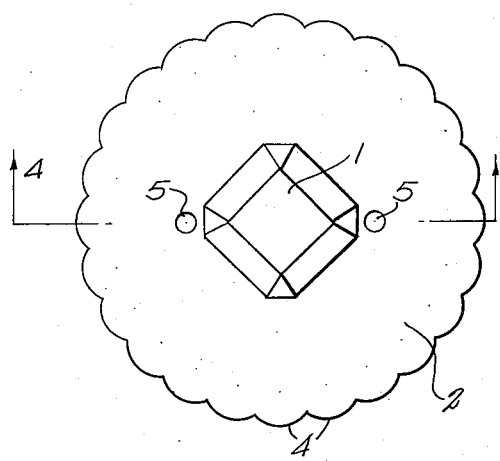
Figure 1 is a top plan view of a dough cutter formed in accordance with the present invention.
Figure 2:
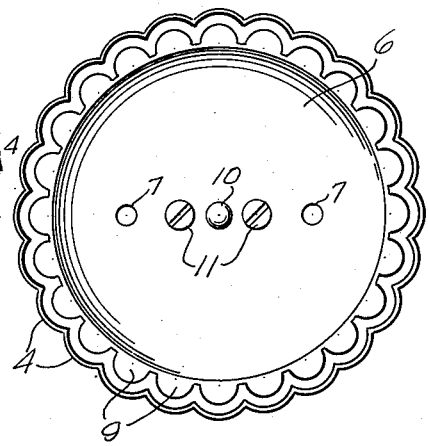
Figure 2 is a bottom plan view.
Figure 3:
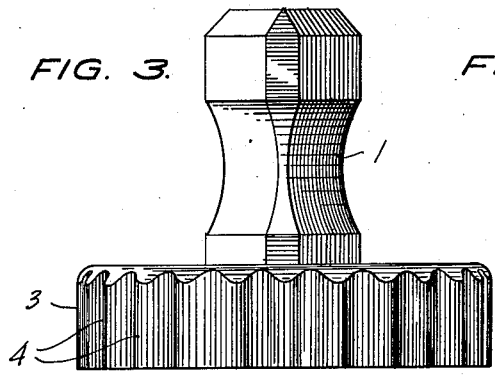
Figure 3 is a side elevational view.
Figure 4:
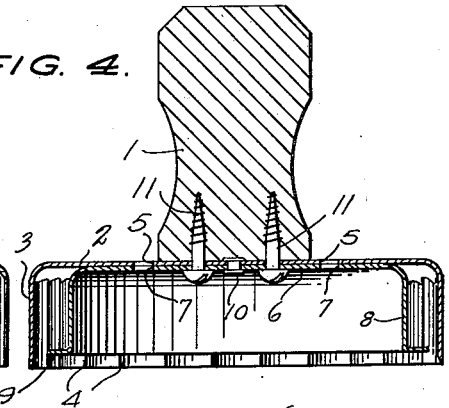
Figure 4 is a sectional view taken substantially on line 4—4 of Figure 1.

Referring to the drawings in detail, I is a handle which may be formed to any desired shape or cross sectional configuration, said handle upstanding from the central portion of an inverted outer cup 2. The outer cup 2 in the present instance is circular in form, but it will be understood that it can be otherwise shaped, this depending upon the shape to which the cookie is to be formed.

The outer cup 2 is integrally formed with a depending peripheral skirt 3 formed throughout its circumference with a series of flutes or corrugations 4.

Formed in the top portion of the outer cup 2 are diametrically opposite openings 5.

Underlying the outer cup is an inner cup 6, having diametrically opposite openings 7 registering with the openings 5, said inner cup being of smaller diameter than the outer cup and having a depending inner skirt 8 spaced inwardly from and concentric with the outer skirt 3. The inner skirt 8 is not, in the present instance, peripherally fluted or corrugated, but rather is of truly circular shape.

At its lower end, the inner skirt is formed with a laterally and outwardly extended peripheral crimping flange 9, the edge of which is spaced inwardly from the outer skirt 3 and is peripherally fluted or corrugated correspondingly to the corrugations 4.

It may be noted that the lower end of the inner skirt 8, and the flange 9, are in a common plane elevated above the plane of the lower end of the outer skirt 3, the distance between the lower ends of the skirts being slightly less than the combined thicknesses of superposed layers of dough to be cut and crimped by the device.

A central rivet 10 extends through the top portions of the inner and outer cups, and permanently connects said cups, and screws 11 are then extended through registered openings formed in the cups, and are threaded upwardly into the base of the handle 1, so as to rigidly assemble the handle with the cups.

The bottom edge of the outer skirt 3, as readily noted from the drawings, is sharpened to provide a cutting edge.

In use of the device, it will be assumed that it is desired to cut filled cookies, and accordingly, a lower layer 12 of dough is rolled out, and at spaced locations thereupon, quantities of filling 13 are deposited. An upper layer of dough 14 is then placed over the lower layer and the quantities of filling.

Figure 5:
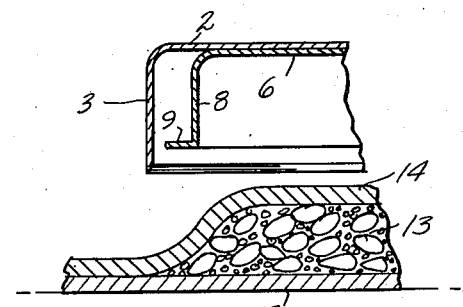
Figure 5 is a fragmentary sectional view of one of the cutters and of superposed dough layers to be cut thereby, the cutter being illustrated immediately prior to severing of the dough.

It is now necessary only to press the cookie cutter down upon the superposed layers, wherever a cookie is to be cut therefrom. The position of the cutter immediately prior to being pressed downwardly in this manner is illustrated in Figure 5.

Figure 6:
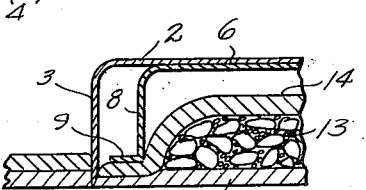
Figure 6 is a view similar to Figure 5, in which the cutter is illustrated immediately after having severed the dough.

When the cookie cutter is forced downwardly upon the superposed layers of dough, the knife edge of the outer skirt 3 will cut downwardly thereinto, cutting the layers along registering lines, around each quantity of filling 13. At the same time, the crimping flange 9 will force the two layers together as shown in Figure 6, and will crimp the severed portions thereof through their full circumferences. Due to the spacing of the edge of the crimping flange from the skirt 3, there will be an annular uncrimped area between the crimped area and the lines along which the dough layers are severed. By spacing the crimped area inwardly from the outer periphery of the cookie in this manner, better adherence of the layers to one another during baking is achieved.

Further, it is important to note that the crimping flange is of plane or flat formation throughout its entire circumference, thus to assure uniform adherence to one another of the layers throughout the periphery of the cookie.

What is claimed is:

A dough cutter including outer and inner cups, said cups having permanently connected top portions, said cups being respectively formed with depending, spaced apart outer and inner skirts, the outer skirt being peripherally fluted and having a knife edge at its lower end for cutting superposed portions of dough along registering lines, the inner skirt being of circular configuration and having its lower end elevated above said knife edge; a handle upstanding from and rigidly connected to said cups; and a crimping flange of plane formation formed upon and extending laterally and outwardly from the lower end of the inner skirt in the direction of the outer skirt, the outer edge of said crimping flange being fluted correspondingly to the outer skirt and being spaced inwardly from said outer skirt whereby to define an uncrimped peripheral area between the lines along which said portions are severed and the areas of the severed portions underlying the crimping flange, said crimping flange being adapted to press the upper of said superposed dough portions flat against the lower of said portions.

WILMA L. LEWIS.

REFERENCES CITED

The following references are of record in the file of this patent:

UNITED STATES PATENTS

| Number | Name | Date |
| --- | --- | --- |
| D. 128,363 | Bricco | July 22, 1941 |
| 824,445 | Scott | June 26, 1906 |
| 1,964,699 | Wikstrom | June 26, 1934 |
| 2,214,475 | Napolillo | Sept. 10, 1940 |
| 2,239,766 | Zabel | Apr. 29, 1941 |
| 2,409,021 | Dale | Oct. 8, 1946 |